UNITED STATES PATENT OFFICE 2,055,798

KETONES OF THE ANTHRACENE SERIES

Paul Nawiasky, Ludwigshafen-on-the-Rhine, and Willy Eichholz, Mannheim, Germany, assignors to General Aniline Works, Inc., New York, N. Y., a corporation of Delaware No Drawing. Application April 23, 1935, Serial No. 17,792. In Germany April 27, 1934

6 Claims. (Cl. 260—57)

The present invention relates to ketones of the anthracene series and a process of producing same.

We have found that ketones of the anthracene series are obtained by treating with acid or alkaline saponifying agents compounds of the general formula:—

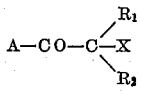

in which A is a monovalent radicle of the anthracene series, X is hydrogen which may be replaced by a metal of the alkaline or alkaline earth metals, $R_1$ is a free or esterified carboxylic acid group and $R_2$ is hydrogen, an acyl radicle or a free or esterified carboxylic acid group. By the said treatment $R_1$ and/or $R_2$ are split off. In the case in which both groups are split off, the reaction may also be carried out in stages. Suitable initial materials are, for example, the compounds obtainable by the condensation of an acid chloride of the anthracene series with alkali or alkaline earth metal malonic esters or alkali or alkaline earth metal acyl-acetic esters. The term "anthracene derivatives" includes not only anthraquinone and its derivatives, but also derivatives of anthrone with attached rings, such as benzanthrone or thiazoleanthrone. When the said metal compounds are difficultly soluble or insoluble in the saponifying agent employed, they are suspended, advantageously while employing a dispersing agent, such as the sodium salt of an alkylated naphthalene sulfonic acid.

The ketones thus obtainable are especially suitable for the preparation of dyestuffs.

The following examples will further illustrate how the said invention may be carried out in practice, but the invention is not restricted to these examples. The parts are by weight.

Example 1

20 parts of the compound:—

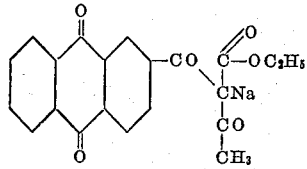

obtainable, for example, by the condensation of anthraquinone-2-carboxylic acid chloride and aceto-acetic ester with alkali metal alcoholate, are slowly introduced while stirring at from 90° to 95° C. into 300 parts of an about 78 per cent sulphuric acid, whereby strong foaming takes place. The whole is stirred at the same temperature until a sample withdrawn from the mixture is no longer colored red by the addition of an excess of caustic soda solution, which is usually the case after about 15 minutes. The liquid is then poured into water whereby a white precipitate is deposited. The precipitate is filtered off by suction, washed if necessary with dilute ammonia to remove any anthraquinone-2-carboxylic acid formed, washed with water and dried. The crude compound crystallizes, for example, from methyl alcohol, in the form of colorless needles. In this manner 2-aceto-anthraquinone (beta-anthraquinonyl-methyl-ketone) is obtained. When employing a less concentrated sulfuric acid, higher temperatures must be employed.

Example 2

1 part of the compound:—

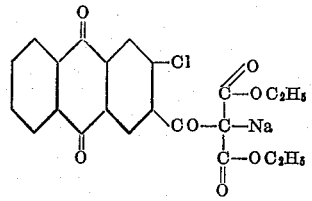

obtainable, for example, by the condensation of 2-chloranthraquinone-3-carboxylic acid chloride and malonic ester with alkali metal alcoholate, is introduced while stirring at from 120° to 125° C. into 20 parts of an about 90 per cent phosphoric acid. Dissolution first takes place with strong foaming; the separation of the reaction product then commences and is complete after stirring for about an hour at the said temperature. The mixture is diluted with water and worked up in the manner described in Example 1. The resulting 2-chlor-3-acetoanthraquinone (melting point from 154° to 156° C.) can be obtained in the form of colorless needles from alcohol. It is readily soluble in the cold in the usual organic solvents. It dissolves in 96 per cent sulphuric acid giving a yellow coloration and in alkaline sodium hydrosulphite solution giving a green coloration. The same compound is obtained by employing concentrated hydrochloric acid as the saponifying agent instead of phosphoric acid.

Example 3

5 parts of the initial material employed in Example 2 are introduced at about 140° C. into a melt of 50 parts of aluminium chloride and 20 parts of common salt. After stirring for an hour the melt, after removing the aluminium compounds with dilute hydrochloric acid, is extracted with dilute ammonia and crystallized from alcohol. The 2-chlor-3-acetoanthraquinone described in Example 2 is thus obtained.

*Example 4*

10 parts of the compound obtainable by the condensation of 1.4-dichloranthraquinone-2-carboxylic acid chloride with malonic ester are introduced slowly while stirring at from 90° to 95° C. into 150 parts of about 78 per cent sulphuric acid. When the whole has dissolved, stirring is continued at the same temperature for an hour and the reaction mixture is worked up as described in Example 1. The 1,4-dichlor-2-acetoanthraquinone thus obtained is soluble with difficulty in methyl and ethyl alcohol in the cold and readily when heated; it is readily soluble in the cold in the other usual organic solvents. It crystallizes from acetone in compact yellow leaflets which melt at from 182° to 183° C. The compound dissolves in sulphuric acid giving a yellow coloration and in alkaline sodium hydrosulfite solution giving a green coloration.

If the condensation product of 1-nitroanthraquinone-2-carboxylic acid chloride with malonic ester be employed as the initial material, 1-nitro-2-acetoanthraquinone is obtained under the same conditions. This melts at from 255° to 257° C., crystallizes from monochlorbenzene in the form of colorless needles and is converted into 1-amino-2-acetoanthraquinone by reduction.

*Example 5*

10 parts of the initial material employed in Example 2 are heated for from about 15 to 20 minutes at from 90° to 95° C. with 200 parts of 5 per cent sodium hydroxide solution, preferably with the addition of 5 parts of sodium hydrosulfite. The red vat is oxidized by leading in air and hydrochloric acid is added to the resulting yellow-red solution. The white precipitate formed is filtered off by suction, washed, dried and dissolved in twenty times its amount of hot nitrobenzene. By cooling, a small amount of 2-chloranthraquinone-3-carboxylic acid formed as a by-product is precipitated, and it is filtered off by suction after after complete cooling. The nitrobenzene is distilled off from the mother liquor with steam, and the residue is crystallized from benzene, after having been filtered off by suction and dried. Colorless needles having a melting point of from 140° to 142° C. are thus obtained. The new compound, as ascertained by analysis, has the composition:—

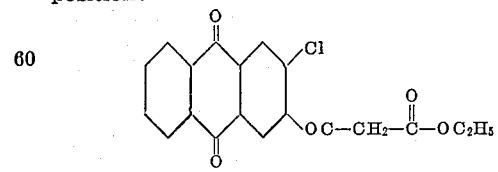

It is therefore formed from the initial material by the splitting off of only one esterified carboxylic group. It is soluble with difficulty in organic solvents of low boiling point and readily soluble in the usual organic solvents of high boiling point. By boiling with dilute aqueous or alcoholic caustic alkali it becomes brown without passing into solution. It dissolves in alkaline sodium hydrosulfite solution giving a red coloration. If it be saponified in the manner described in the foregoing examples, it is converted into 2-chlor-3-acetoanthraquinone.

*Example 6*

A solution of 20 parts of the compound obtainable by the condensation of Bz,1-benzanthrone carboxylic acid chloride with malonic ester is heated for about half an hour at 100° C. with 300 parts of about 78 per cent sulfuric acid. By pouring the solution, after cooling, into water, a yellow precipitate is deposited which is filtered off by suction and boiled with about 3 per cent caustic soda solution. The compound, thus freed from any Bz,1-benzanthrone carboxylic acid which may have been formed, is filtered off by suction, washed with water and dried. It may be purified, for example, by sublimation in a high vacuum. The Bz,1-acetobenzanthrone thus obtained crystallizes from benzene in the form of yellow needles having a melting point of from 174° to 175° C. and dissolving in 96 per cent sulfuric acid giving a brown coloration and a yellow fluorescence. It may be oxidized to form Bz,1-benzanthrone carboxylic acid by means of sodium hypochlorite solution.

If the condensation product of thiazolanthrone-2-carboxylic acid chloride and malonic ester be employed as the initial material, 2-acetothiazolanthrone is obtained which crytallizes from trichlorbenzene in the form of yellow needles. It dissolves in 96 per cent sulfuric acid giving a red-brown coloration and in alkaline sodium hydrosulfite solution giving a bluish red coloration.

*Example 7*

1 part of the initial material employed in Example 2 is heated for two hours at from 60° to 65° C. with 15 parts of methyl-sulfuric acid and the resulting brown solution poured into water after cooling. The carboxylic acid thus separated may be purified by way of its sodium salt which is soluble with difficulty in water. For the purpose of further purification it may be crystallized from nitrobenzene. The compound thus obtained in the form of yellow needles probably has the formula:—

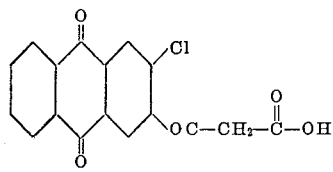

It is soluble with difficulty in alkalies and carbonate alkalies and rather readily soluble in aqueous pyridine. It dissolves in 96 per cent sulfuric acid giving a yellow coloration and in alkaline sodium hydrosulfite solution giving a red coloration. By heating the solution in sulfuric acid to about 80° C., carbon dioxide is split off and 2-chlor-3-acetoanthraquinone is formed.

*Example 8*

A solution of 1 part of the compound, obtainable by causing anthracene-2-carboxylic acid chloride to act on sodium malonic ester in the presence of anhydrous ethanol, in 15 parts of about 80 per cent sulfuric acid is heated for 1 to 2 hours at 90° to 95° C. After working up in the manner described in Example 1, 2-acetoanthracene (beta-anthracyl methyl ketone) is obtained in a yield of about 50 per cent.

If the compound obtained by reacting 2-chloranthracene-3-carboxylic acid chloride with sodium malonic ester is employed as starting material, a compound is obtained in a yield of about 55 per cent, which has properties similar to those of 2-acetoanthracene and which is according to analysis 2-chlor-3-acetoanthracene. It dissolves in concentrated sulfuric acid giving a blue coloration, whereas 2-acetoanthracene dissolves in concentrated sulfuric acid giving a violet coloration.

*Example 9*

1 part of the compound:—

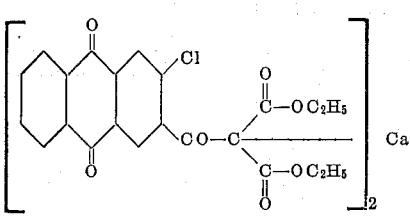

(obtainable, for example, by condensing 2-chloranthraquinone-3-carboxylic acid chloride and malonic ester with calcium alcoholate) is heated for about an hour with an about 78 per cent sulfuric acid. The reaction mixture is then poured into water and the resulting white precipitate filtered off by suction; the precipitate is washed with ammonia, if necessary, for the removal of anthraquinone-2-carboxylic acid also formed, washed with water and dried. After crystallization from alcohol, 2-chlor-3-acetoanthraquinone is obtained.

Instead of the calcium compound, the barium or strontium compounds may also be employed.

If the saponification is carried out in alkaline solution in the manner described in Example 5, the ketonic acid ester described therein and having the composition:

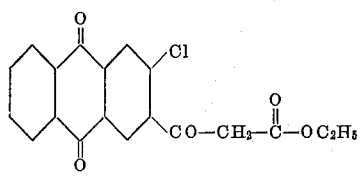

is obtained.

*Example 10*

A suspension of 10 parts of the compound:—

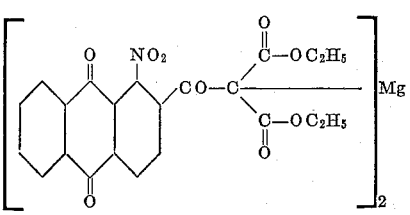

(obtainable, for example, by condensing 1-nitroanthraquinone-2-carboxylic acid chloride with magnesium malonic ester in absolute alcohol) in 100 parts of about 10 per cent sulfuric acid to which has been added 1 part of the sodium salt of a butylnaphthalene sulfonic acid is heated to boiling until complete saponification has taken place. The reaction mixture is worked up in the manner described in Example 1. After crystallization, the 1-nitro-2-acetoanthraquinone described in Example 4 is obtained.

*Example 11*

1 part of the compound:—

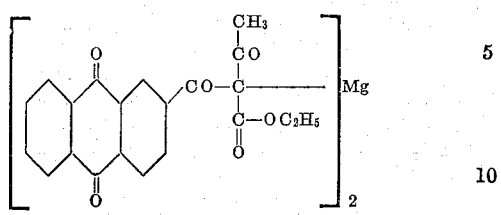

(obtainable, for example, by condensing anthraquinone-2-carboxylic acid chloride with magnesium aceto-acetic ester in absolute alcohol) is introduced while stirring at from 90° to 95° C. into 15 parts of about 78 per cent sulfuric acid, a strong evolution of carbon dioxide taking place. When the latter has ceased, the whole is stirred for about half an hour at the said temperature and then worked up in the manner described in Example 9. 2-acetoanthraquinone is thus obtained.

Instead of sulfuric acid, phosphoric acid, concentrated hydrochloric acid or sodium aluminium chloride (see Example 3) may be employed as the saponifying agent.

*Example 12*

A mixture of 1 part of the compound obtainable by reacting 1,4-dichloranthraquinone-6-carboxylic acid chloride with magnesium malonic ester in the presence of anhydrous ethanol, 10 parts of 10 per cent sulfuric acid and 1 part of the sodium salt of a butyl naphthalene sulfonic acid is boiled for three hours. The mixture is then worked up in the manner described in Example 9. 1,4-dichlor-6-acetoanthraquinone is obtained in a yield of about 80 per cent. By recrystallization from monochlorbenzene yellow needles are obtained which melt at 235° C. The compound has properties similar to those of 1,4-dichlor-2-acetoanthraquinone described in Example 4.

If the compound obtainable by reacting Bz,1-benzanthronyl carboxylic acid chloride or thiazoleanthrone-2-carboxylic acid chloride with magnesium malonic ester is employed as starting material, Bz, 1-acetobenzanthrone or 2-acetothiazoleanthrone, respectively, are obtained.

*Example 13*

A suspension of 10 parts of the compound obtainable by reacting anthracene-2-carboxylic acid chloride with magnesium malonic ester in the presence of anhydrous ethanol, in 100 parts of about 10 per cent sulfuric acid is treated in the manner described in Example 10. 2-acetoanthracene is obtained in a yield of about 60 per cent.

If 2-chloranthracene-3-carboxylic acid chloride is employed instead of anthracene-2-carboxylic acid chloride, 2-chlor-3-acetoanthracene is obtained in a yield of about 70 per cent.

What we claim is:

1. A process of producing ketones of the anthracene series which comprises treating with saponifying agents compounds of the general formula

in which A is a monovalent radicle of the anthracene series, $R_1$ is selected from the group consisting of the free and esterified carboxylic acid groups, $R_2$ from the group consisting of hydrogen, the acyl, and the free and esterified carboxylic acid groups, and in which the valency designated by X is satisfied by an element selected from the group consisting of hydrogen and the alkali- and alkaline earth metals.

2. A process of producing ketones of the anthracene series which comprises treating in the presence of a dispersing agent with saponifying agents compounds of the general formula

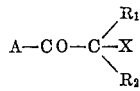

in which A is a monovalent radicle of the anthracene series, $R_1$ is selected from the group consisting of the free and esterified carboxylic acid groups, $R_2$ from the group consisting of hydrogen, the acyl, and the free and esterified carboxylic acid groups, and in which the valency designated by X is satisfied by an element selected from the group consisting of hydrogen and the alkali- and alkaline earth metals.

3. Beta-acetoanthraquinones containing a negative substituent selected from the group consisting of halogen and the nitro group.

4. Monohalogen-beta-acetoanthraquinones.

5. 2-chlor-3-acetoanthraquinone.

6. 1-nitro-2-acetoanthraquinone.

PAUL NAWIASKY.
WILLY EICHHOLZ.